United States Patent
Mayer et al.

(10) Patent No.: US 11,327,152 B2
(45) Date of Patent: May 10, 2022

(54) FMCW RADAR SENSOR INCLUDING SYNCHRONIZED HIGH-FREQUENCY MODULES

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 16/642,454

(22) PCT Filed: Jul. 12, 2018

(86) PCT No.: PCT/EP2018/068870
§ 371 (c)(1),
(2) Date: Feb. 27, 2020

(87) PCT Pub. No.: WO2019/048110
PCT Pub. Date: Mar. 14, 2019

(65) Prior Publication Data
US 2020/0191906 A1 Jun. 18, 2020

(30) Foreign Application Priority Data
Sep. 5, 2017 (DE) .......................... 102017215561.2

(51) Int. Cl.
*G01S 7/35* (2006.01)
*G01S 7/00* (2006.01)
(Continued)

(52) U.S. Cl.
CPC .............. *G01S 7/354* (2013.01); *G01S 7/006* (2013.01); *G01S 7/4021* (2013.01);
(Continued)

(58) Field of Classification Search
CPC .... G01S 13/343; G01S 13/354; G01S 13/762; G01S 13/87; G01S 13/003; G01S 13/345; G01S 7/2813; G01S 7/356
(Continued)

(56) References Cited

U.S. PATENT DOCUMENTS 5,532,700 A * 7/1996 Lockwood .......... G01S 7/52003
342/378
6,300,895 B1 * 10/2001 Carrara ................. G01S 13/003
342/55

(Continued)

FOREIGN PATENT DOCUMENTS

DE 69612252 T2 10/2001
WO 2018158281 A1 9/2018

OTHER PUBLICATIONS

International Search Report for PCT/EP2018/068870, dated Oct. 11, 2018.

Primary Examiner — Erin F Heard
Assistant Examiner — Michael W Justice
(74) Attorney, Agent, or Firm — Norton Rose Fulbright US LLP; Gerard Messina

(57) ABSTRACT

FMCW radar sensor including multiple high-frequency modules, which are synchronized with one another by a synchronization signal. At least one includes a transmitting part for generating a frequency-modulated transmit signal. At least two high-frequency modules, physically separated from one another, each include a receiving part for receiving a radar echo, each receiving part being assigned a mixer, which generates an intermediate frequency signal by mixing the received signal with a portion of the transmit signal, and an evaluation unit. The evaluation unit is designed to record the intermediate frequency signal over a measuring period as a function of time, and to subject the time signal thus obtained to a Fourier transform. At least one of the evalu- (Continued)

ation units is designed to window the time signal before the Fourier transform using a complex-valued window function to compensate for a propagation time difference of the synchronization signal between the receiving parts.

5 Claims, 2 Drawing Sheets

(51) Int. Cl.
*G01S 7/40* (2006.01)
*G01S 13/34* (2006.01)
*G01S 13/58* (2006.01)
*G01S 13/87* (2006.01)
*G01S 13/931* (2020.01)
*G06F 17/14* (2006.01)

(52) U.S. Cl.
CPC .......... *G01S 13/343* (2013.01); *G01S 13/347* (2013.01); *G01S 13/584* (2013.01); *G01S 13/87* (2013.01); *G01S 13/931* (2013.01); *G06F 17/142* (2013.01); *G01S 7/356* (2021.05)

(58) Field of Classification Search
USPC .................................................. 342/70, 192
See application file for complete search history.

(56) References Cited

U.S. PATENT DOCUMENTS

| | | | |
|---|---|---|---|
| 7,148,839 B2 * | 12/2006 | Chen | G01S 13/003 342/125 |
| 7,336,218 B2 * | 2/2008 | Nishimura | G01S 13/345 342/70 |
| 9,575,175 B2 * | 2/2017 | Grooters | G01S 7/4008 |
| 10,627,482 B2 * | 4/2020 | Frick | G01S 7/352 |
| 10,690,750 B2 * | 6/2020 | Bilik | G01S 13/003 |
| 2006/0202885 A1 * | 9/2006 | Chen | G01S 13/003 342/126 |
| 2007/0040728 A1 * | 2/2007 | Nishimura | G01S 13/426 342/70 |
| 2014/0062753 A1 * | 3/2014 | Grooters | G01S 13/933 342/21 |
| 2018/0210067 A1 * | 7/2018 | Bilik | G01S 13/87 |
| 2018/0372839 A1 * | 12/2018 | Frick | G01S 7/352 |

* cited by examiner

FMCW RADAR SENSOR INCLUDING SYNCHRONIZED HIGH-FREQUENCY MODULES

The present invention relates to an FMCW radar sensor including multiple high-frequency modules, which are synchronized with one another via a synchronization signal and which include at least two high-frequency modules physically separated from one another, each of which includes a transmitting part for transmitting a frequency-modulated transmit signal and/or a receiving part for receiving a radar echo, each receiving part being assigned a mixer, which generates an intermediate frequency signal by mixing the received signal with a portion of the transmit signal, and an evaluation unit, and the evaluation unit being designed to record the intermediate frequency signal over a measuring period as a function of time and to subject the time signal thus obtained to a Fourier transform.

BACKGROUND INFORMATION

The frequency of the transmit signals is modulated in conventional FMCW radar sensors in a ramp-shaped manner. In the receiving part, an intermediate frequency signal, whose frequency is a function of the difference in frequency between the instantaneously transmitted signal and the received signal, is obtained by mixing the received signal with the transmit signal. Due to the ramp-shape modulation, this difference in frequency is a function of the propagation time of the radar waves from the sensor to the object and back to the sensor. With a Fourier transform, a spectrum of the intermediate frequency signal is obtained, in which each located object appears as a peak at a frequency that is a function of the distance of the object. Due to the Doppler effect, however, the frequency position of the peak is also a function of the relative speed of the object. In order to separate the distance and speed-dependent portions from one another, it is conventional to run in succession multiple frequency ramps having different slopes. Since only the distance-dependent portion of the frequency is a function of the ramp slope, it is possible to determine the distance and the relative speed of the object by comparing the frequency positions obtained on the various ramps.

The fact that the measuring period over which the time signal is recorded may have only a limited duration means that artefacts in the form of side lobes are produced during the Fourier transform, which complicate the interpretation of the signal. Conventionally, such side lobes are largely suppressed by "windowing" the time signal before the Fourier transform using a suitable window function, for example, by multiplying the time signal by an equally time-dependent window function. The window function, for example, a so-called Hamming window, primarily has the effect of smoothing the abrupt transitions in the time signal at the beginning and at the end of the measuring period and thereby mitigating the side lobes.

Radar sensors of this type are used to a large extent as sensory components in driver assistance systems for motor vehicles. In the course of the further development of driver assistance systems in the direction of highly autonomous driving, increasingly greater demands are placed on the efficiency of radar sensors. A comparatively cost-efficient way to meet these demands is that instead of developing new and more efficient components, multiple components of the same type are allowed to operate in parallel to one another. This allows for reliance on components already available and serially produced, but does require the multiple high-frequency modules to be precisely synchronized with one another.

Since the various high-frequency modules must necessarily have a certain physical distance relative to one another, a sufficiently exact synchronization proves to be difficult in view of the unavoidable signal propagation time of the synchronization signal from one module to the next. It is potentially possible to avoid differences in propagation time by symmetrically arranging the modules or via phasing lines, however, this requires a considerable effort and an increased space requirement on the circuit board. This applies, in particular, in those cases in which the module, which as master generates the synchronization signal, is to be synchronized with the remaining modules (slaves). The locally generated synchronization signal must then be artificially delayed in the master.

SUMMARY

An object of the present invention is to enable a simpler synchronization of the multiple high-frequency modules in a radar sensor of the type mentioned at the outset.

This object may be achieved according to the present invention in that at least one of the evaluation units is designed to window the time signal before the Fourier transform using a complex-valued window function to compensate for a difference in propagation time of the synchronization signal between the receiving parts.

The present invention utilizes a property of the Fourier transform, in which a suitable complex-valued window function may result in the spectrum obtained via the Fourier transform being shifted on the frequency axis by an adjustable amount. If the transmit signal is transmitted by one module and received by another module, then the signal propagation time of the synchronization signal from the one module to the other results in a frequency difference when the received signal is mixed with the transmit signal (which, in turn, is synchronous with the synchronization signal), which impacts the spectrum of the intermediate frequency signal similarly to a changed signal propagation time of the radar waves, and which thus simulates a change of the object distance. Since the frequency shift of the peak in the spectrum achieved by the window function may then also be interpreted as an (apparent) change of the object distance (the influence of the Doppler effect in the case of non-vanishing relative speed need not be considered here), it is possible to compensate for the signal propagation time of the synchronization signal by a suitable frequency shift with the aid of the window function, without the need for complex measures for aligning the propagation lengths of the synchronization signal to the individual modules.

Advantageous embodiments and refinements of the present invention are described herein.

In one specific embodiment of the present invention, one of the high-frequency modules is operated as a master, while one or multiple high-frequency modules operate as slaves. In this case, both the master as well as the slaves may each include a transmitting part and a receiving part, so that a switch may be made between operating modes, in which the master or one of the slaves transmits the transmit signal. The radar echoes may then be received by all high-frequency modules, i.e., also by the module that transmitted the transmit signal. The synchronization error may be compensated for in each case in the module that receives the radar echo but does not itself transmit.

The present invention is also applicable in a configuration, in which a single high-frequency module receives signals that have been transmitted by different high-frequency modules physically separated from one another (with signal separation, for example, in time multiplex, code multiplex or frequency multiplex).

An exemplary embodiment is explained below with reference to the figures.

DETAILED DESCRIPTION OF EXAMPLE EMBODIMENTS

Figure 1:
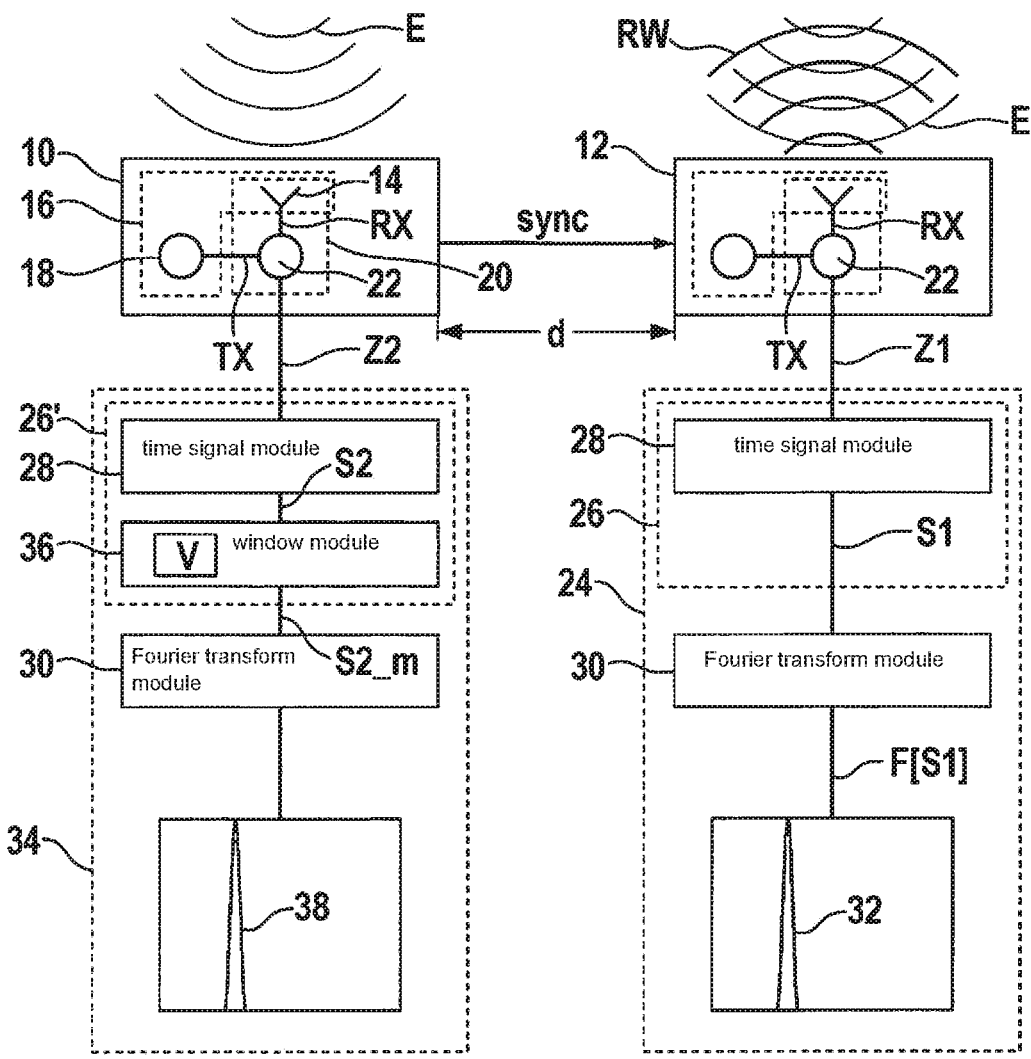
FIG. 1 shows a block diagram of main components of a radar sensor according to the present invention.

The radar sensor shown in FIG. 1 includes two structurally identical high-frequency modules 10, 12, each of which contains an antenna assembly 14, a transmitting part 16 including a local oscillator 18, and a receiving part 20 including a mixer 22. Antenna assembly 14 is used both to transmit as well as to receive radar waves, and is therefore a shared component of transmitting part 16 and of receiving part 20. High-frequency module 10 in the example shown operates as a master and high-frequency component 12 operates as a slave. The master generates a synchronization signal sync, which is conveyed to high frequency module 12 operating as the slave (and, if necessary, to additional slaves). Local oscillator 18 in high-frequency module 12 (slave) generates a frequency modulated transmit signal TX having a ramp-shaped modulation scheme, which is synchronized with synchronization signal sync, and conveys this transmit signal TX (via mixer 22 in the example shown) to antenna assembly 14, so that radar waves RW are radiated. Radar echo E reflected by an object not shown is received by the antenna assembly in high-frequency module 12. A received signal RX is mixed in mixer 22 with a portion of transmit signal TX, as a result of which an intermediate frequency signal Z1 is generated, which is output to an evaluation unit 24.

Evaluation unit 24 contains a pre-processing stage 26 including a time signal module 28, in which intermediate frequency signal Z1 is digitized and is recorded over a particular measuring period as a function of time. In this way, a digitized time signal S1 is formed, which is delivered to a Fourier transform module 30 of evaluation unit 24 where it is converted by Fourier transform into a spectrum F[S1]. The spectrum is also graphically depicted in FIG. 1 and contains a single peak 32, whose frequency position indicates the distance of the located object (for the sake of simplicity, it is to be assumed here that the relative speed of the object is zero, so that no Doppler shift is present).

High-frequency module 10 operating as the master is used in this example not for transmitting, but only for receiving radar echo E. Local oscillator 18 in high-frequency module 10 generates transmit signal TX, which is frequency modulated in the same manner as in high-frequency module 12, the modulation scheme being synchronized with synchronization signal sync, which is generated locally in high-frequency module 10. Transmit signal TX in this case, however, is not relayed to antenna assembly 14, but is merely mixed with received signal RX in mixer 22, so that here too, an intermediate frequency signal Z2 is obtained which, when perfectly synchronized, should be identical to intermediate frequency signal Z1.

Intermediate frequency signal Z2 arrives at a pre-processing stage, which is identified here with 26' and which differs from pre-processing stage 26 only in that a window module 36, in which time signal S2 generated from intermediate frequency signal Z2 is windowed using a window function V, is connected downstream from time signal module 28. As a result, a modified time signal S2_$m$ is formed, which is then subjected to the Fourier transform in Fourier transform module 30. Spectrum F[S2_$m$] obtained in this way is ideally intended to be identical to spectrum F[S1] obtained in high-frequency module 12, and thus show a peak 38, whose frequency position coincides with that of peak 32. Under this condition, it is possible to subject the spectra obtained in the two (or multiple) high-frequency modules to a combined evaluation in order to achieve a greater efficiency of the radar sensor. The two spectra may, for example, be added together in order to improve the signal/noise ratio.

However, one complication arises from that fact that a certain physical distance unavoidably exists between the two high-frequency modules 10, 12, so that synchronization signal sync must travel a certain signal path d from the master to the slave. Accordingly, the synchronization signal is delayed by a signal propagation time d/c when it arrives at high-frequency module 12 (c is the propagation speed of the synchronization signal). This delay results in a synchronization error between the modulation patterns of transmit signals TX in the two high-frequency modules.

Figure 2:
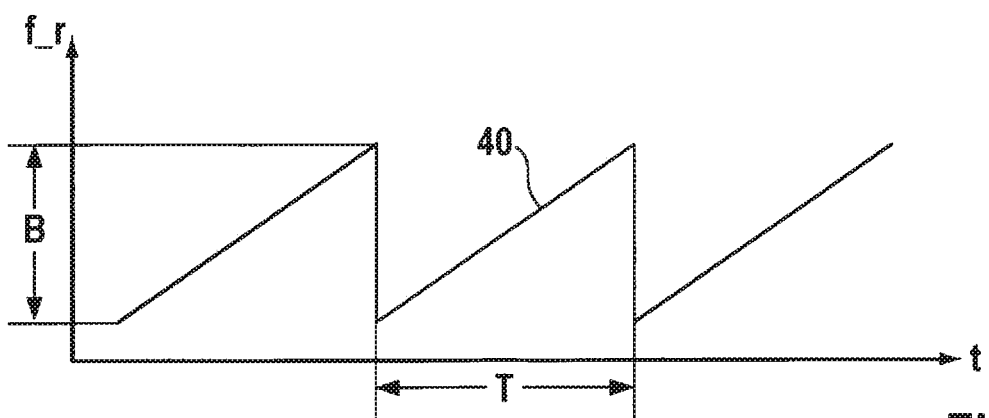
FIG. 2 shows a time diagram for illustrating the frequency modulation in a FMCW radar.

A (simplified) example of a modulation scheme is shown in FIG. 2. Frequency f_$r$ of the transmit signal is depicted here as a function of time t and includes a sequence of modulation ramps 40 having a ramp slope B/T, B being the frequency deviation and T being the duration of the modulation ramp. At the same time, this duration T is also the duration of the measuring period over which the time signal is recorded in time signal module 28.

In high-frequency module 12, which operates here as a transmitter, the start of each modulation ramp 40 is delayed by signal propagation time d/c compared to the start of the modulation ramp in high-frequency module 10. Since the same received signal RX is received in both high-frequency modules 10, 12, but this signal is mixed with transmit signals TX time-shifted with respect to one another, the frequency of time signal S2 in high frequency module 10 is determined not only by the distance of the located object and the corresponding signal propagation time of the radar waves, but it also contains an additional portion, which is conditioned by the fact that modulation ramp 40 in high-frequency module 10 started already earlier by time d/c. The purpose of window module 36 in evaluation unit 26' for high-frequency module 10 is to compensate for this frequency offset.

Figure 3:
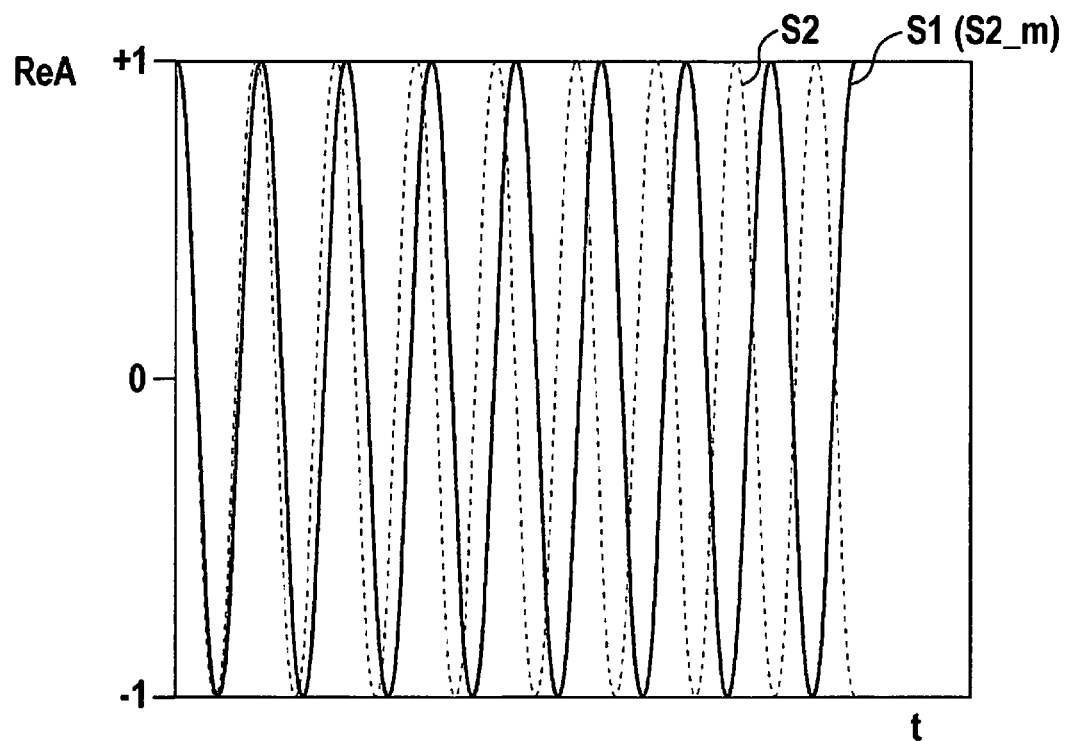
FIG. 3 shows examples for time signals, which are received in various high-frequency modules of the radar sensor according to FIG. 1.

Time signals S1 and S2 as functions of time t are depicted in FIG. 3. Only real part ReA of standardized (complex) amplitude A is indicated here on the vertical axis. It is apparent that the frequency of time signal S2 is increased as compared to the frequency of time signal S1 due to the synchronization error described above. This frequency offset is reversed again in window module 36 so that modified time signal S2_$m$ ideally coincides with time signal S1. For this purpose, time signal S2 in window module 36, i.e., the time-dependent function S2(t), is multiplied by an equally time-dependent window function $$V(t)=\exp(-j*2*pi*(1/T)*(t-x)*b) \quad (1)$$

in which j is the square root of (−1), pi is the circular ratio, T is the duration of the measuring period and also the ramp duration, b is a so-called bin offset, which is selected so that the synchronization error is compensated for, and x is an arbitrary value of interval [0, T], which causes a constant phase shift. x=T/2 has proven to be advantageous.

Window function V(t) is a complex-valued function, whose absolute value constantly has the value 1 and whose phase is proportional to time t and to bin offset b. The term "bin offset" is a result of the fact that the range of frequencies f, on which spectra F[S2_m] and F[S1] are defined, is subdivided into a multitude (for example, 512) of bins, each of which has a bin width W=c/2B, as shown in FIG. 4.

Figure 4:
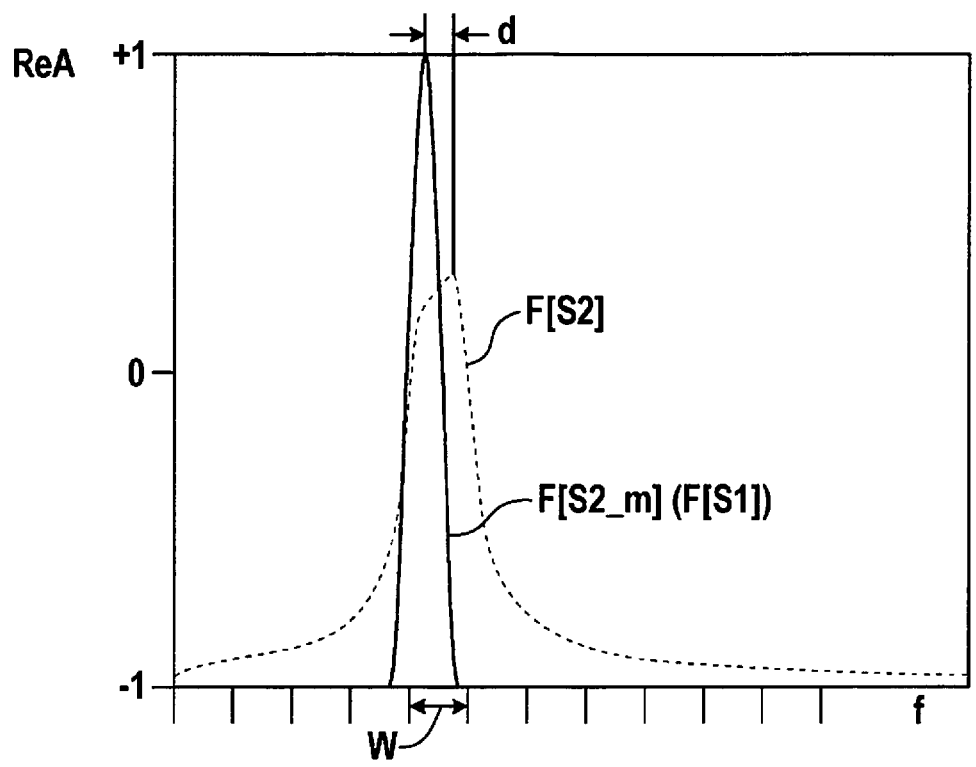
FIG. 4 shows spectra of the time signals according to FIG. 3.

A spectrum F[S2] is also shown by comparison in FIG. 4, which would be obtained by Fourier transform of time signal S2, i.e., without windowing using window function V. It is apparent that the corresponding peak in the spectrum is at a somewhat higher frequency than the peak in the spectra F[S2_m] and F[S1], coinciding with the frequency difference, which is also apparent in FIG. 3.

It should be noted that bin width W has the dimension of a length, whereas frequency f is indicated as an independent variable on the horizontal axis in FIG. 4. For the radar echo of an object having object distance D, however, frequency f, at which the peak originating from the object lies, is indicated by $$F=(B/T*2D/c \quad (2)$$

Thus, frequency f may also be considered as a measure for object distance D. The frequency bins shown in FIG. 4 are therefore equivalent to distance bins having bin width W.

Bin offset b is indicated by the ratio between the propagation length d of the synchronization signal and bin width W, i.e., $$b=d/W=d*2B/c \quad (3)$$

Under these conditions, the frequency offset between the peaks in spectra F[S2] and F[S2_m] is equivalent to an apparent change of object distance D, which is equal to propagation length d. Consequently, spectrum F[S2_m] in FIG. 4 coincides essentially with spectrum F[S1] obtained in the other frequency module, thus compensating for the synchronization error.

In one practical specific embodiment, pre-processing stage 26, which is assigned to high-frequency module 12, will also contain a window module 36. In addition to the complex phase factor specified in equation (1), window function V may also contain a real factor, which is used to suppress side lobes. The window modules in the two pre-processing stages may then each be switched between a window having a complex phase factor and a real window without this factor, depending on whether or not a synchronization error must be corrected. Thus, an operating mode may also be implemented, in which the master, i.e., high-frequency module 10, transmits and receives, whereas the slave, i.e., high-frequency module 12 only receives. In that case, the complex phase factor would be deactivated in high-frequency module 10 and activated in high-frequency module 12.

An operating mode would also be conceivable—with corresponding adaptation of the window function—in which high-frequency module 12 forms the master and high-frequency module 10 forms the slave.

Synchronization signal sync could, in principle, also be directly formed by transmit signal TX generated by the master. If the slave transmits, it would then simply relay the synchronization signal obtained from the master as a transmit signal to antenna assembly 14. The slave would then not need to include any separate local oscillator.

What is claimed is:

1. An FMCW radar sensor, comprising:
multiple high-frequency modules which are synchronized with one another by a synchronization signal, the multiple high-frequency modules including at least two high-frequency modules physically separated from one another, each of the at least two high-frequency modules including a transmitter part configured to transmit a frequency-modulated transmit signal, and each of the at least two high-frequency modules including a receiver part configured to receive a radar echo, each of the receiver parts being assigned a mixer, which generates an intermediate frequency signal by mixing a received signal with a portion of the transmit signal, and an evaluation circuit, the evaluation circuit configured to record the intermediate frequency signal over a measuring period as a function of time and to subject a time signal thus obtained to a Fourier transform;
wherein each of the evaluation circuits is configured to window the time signal before the Fourier transform using a complex-valued window function to compensate for a propagation time difference of the synchronization signal between the receiver parts;
wherein each of the evaluation circuits include a window circuit which is switchable between the complex-valued window function to compensate for the propagation time difference of the synchronization signal between the receiver parts and a purely real window function when compensation for the propagation time difference is not necessary, wherein compensation for the propagation time difference is not necessary by a high-frequency module of the at least two high-frequency modules that both transmits the frequency-modulated transmit signal and receives the radar echo.

2. The radar sensor as recited in claim 1, wherein the windowing using the complex-valued window function includes a multiplication of the time signal by a time-dependent window function, which, in addition to a real factor having a time-dependent variable absolute value, contains a complex phase factor in the form of $$\exp(j-*w*(t-x)),$$

wherein j is the square root of −1, t is the time, w is proportional to a signal path d, which the synchronization signal must travel between the high-frequency modules, and x is a value in an interval [0, T], and T is a duration of the measuring period.

3. The radar sensor as recited in claim 2, wherein x=T/2.

4. The radar sensor as recited in claim 1, wherein the transmitter parts are configured to modulate a frequency of the transmit signal in a ramp-shaped manner with a frequency deviation B for a duration T of the measuring period, wherein the windowing using the complex-valued window function includes a multiplication of the time signal by a time-dependent window function which, in addition to a real factor having a time-dependent variable absolute value, contains a complex phase factor indicated by $$\exp(-j*2*pi*(1/T)*(t-x)*b),$$

in which j is the square root of −1, b=d*2B/c, c being a propagation speed of the synchronization signal, d being a length of the signal path of the synchronization signal from one high-frequency module to the next, t is the time, and x is a value in an interval [0, T].

5. The radar sensor as recited in claim 4, wherein x=T/2.

* * * * *